United States Patent
Yamamoto et al.

(10) Patent No.: US 8,851,472 B2
(45) Date of Patent: Oct. 7, 2014

(54) PAPER SHEET HANDLING MACHINE AND PAPER SHEET HANDLING METHOD

(75) Inventors: Hideki Yamamoto, Yokosuka (JP); Atsushi Nagase, Himeji (JP); Toshihiko Suzuki, Tokyo-To (JP); Kenji Nahata, Tokyo-To (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 0 days.

(21) Appl. No.: 13/490,790

(22) Filed: Jun. 7, 2012

(65) Prior Publication Data

US 2012/0313316 A1   Dec. 13, 2012

(30) Foreign Application Priority Data

Jun. 7, 2011  (JP) ................................. 2011-127166

(51) Int. Cl.
| | | |
|---|---|---|
| B65H 7/02 | (2006.01) | |
| G07D 7/00 | (2006.01) | |
| G07D 11/00 | (2006.01) | |
| G07D 7/20 | (2006.01) | |

(52) U.S. Cl.
CPC .......... *G07D 7/0033* (2013.01); *G07D 11/0084* (2013.01); *G07D 7/2016* (2013.01)
USPC ........ 271/265.01; 382/135; 382/311

(58) Field of Classification Search
CPC ............ G07D 2207/00; G07D 7/0033; G07D 11/0084; G07D 7/2016
USPC .............................. 271/265.01; 382/135, 311
See application file for complete search history.

(56) References Cited

U.S. PATENT DOCUMENTS

| | | | |
|---|---|---|---|
| 6,980,684 B1 | 12/2005 | Munro et al. | |
| 8,162,125 B1 * | 4/2012 | Csulits et al. | 194/206 |
| 8,204,293 B2 * | 6/2012 | Csulits et al. | 382/135 |
| 8,391,583 B1 * | 3/2013 | Mennie et al. | 382/135 |
| 2008/0219543 A1 * | 9/2008 | Csulits et al. | 382/135 |

(Continued)

FOREIGN PATENT DOCUMENTS

| | | |
|---|---|---|
| DE | 10 2004 049209 A1 | 4/2006 |
| EP | 1 437 692 A1 | 7/2004 |
| RU | 80 257 U1 | 1/2009 |
| RU | 2 401 458 C9 | 10/2010 |

OTHER PUBLICATIONS

EP Search Report (Application No. 12170835.8) (8 pages—dated Apr. 10, 2012).

(Continued)

*Primary Examiner* — Jeremy R Severson
(74) *Attorney, Agent, or Firm* — Renner, Kenner, Greive, Bobak, Taylor & Weber

(57) ABSTRACT

A paper sheet handling machine according to the present invention includes: an imaging unit configured to take an image of a paper sheet and generate a paper sheet image; an identification unit configured to identify a character of each digit position included in a serial number, from a serial number region of the paper sheet image; an output unit configured to output the image of a part corresponding to the serial number region of the paper sheet image, when there is a digit position whose character therein cannot be identified by the identification unit; a display unit configured to display each character identified by the identification unit as well as the image outputted from the output unit; and an input unit configured to accept input of each character corresponding to the digit position whose character therein cannot be identified by the identification unit.

13 Claims, 7 Drawing Sheets

(56) References Cited

U.S. PATENT DOCUMENTS

2010/0092065 A1    4/2010   Jones et al.
2012/0150745 A1*   6/2012   Csulits et al. .................. 705/45
2012/0189186 A1*   7/2012   Csulits et al. ................ 382/135

OTHER PUBLICATIONS

Russian Application No. 2012123513—Decision on Grant issued on Apr. 30, 2014 (7 pages).

* cited by examiner

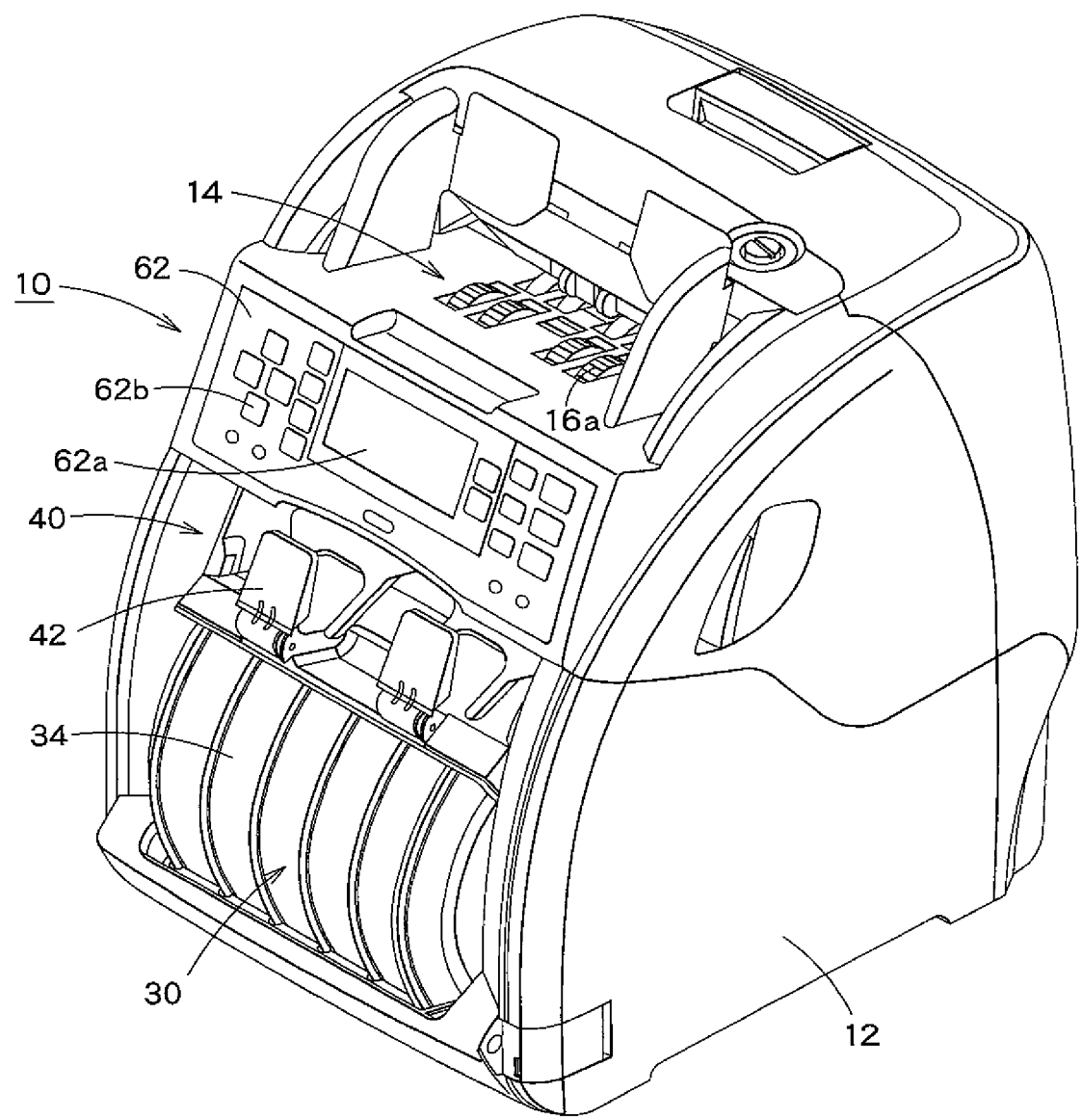
F I G. 1

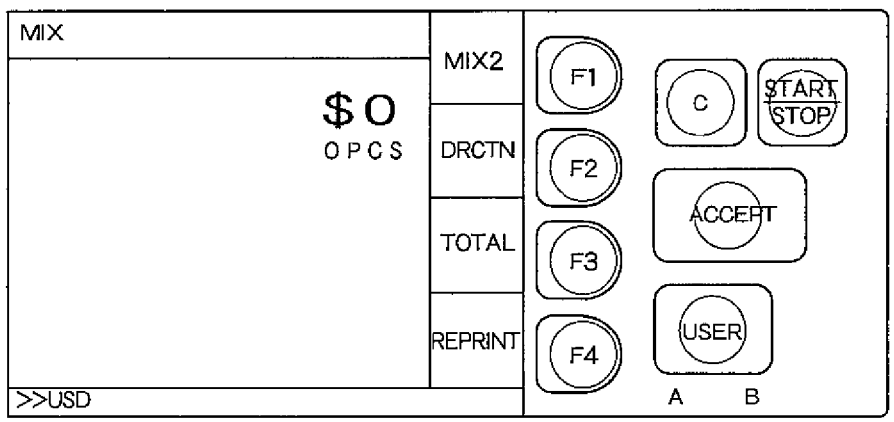
F I G. 6
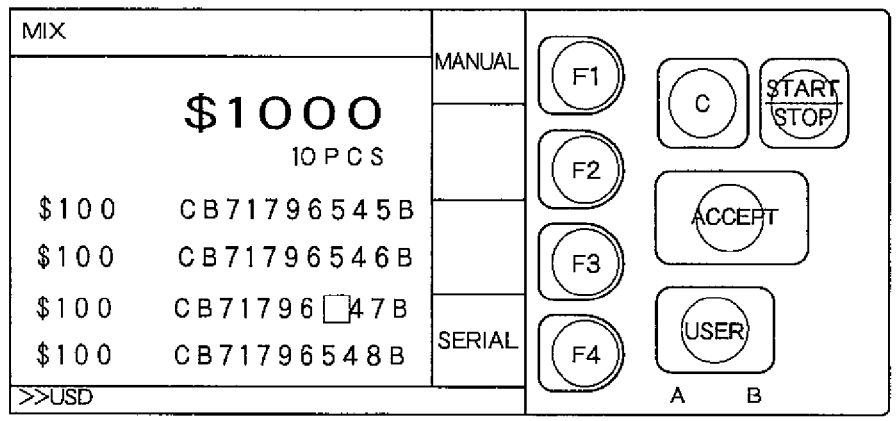
F I G. 7
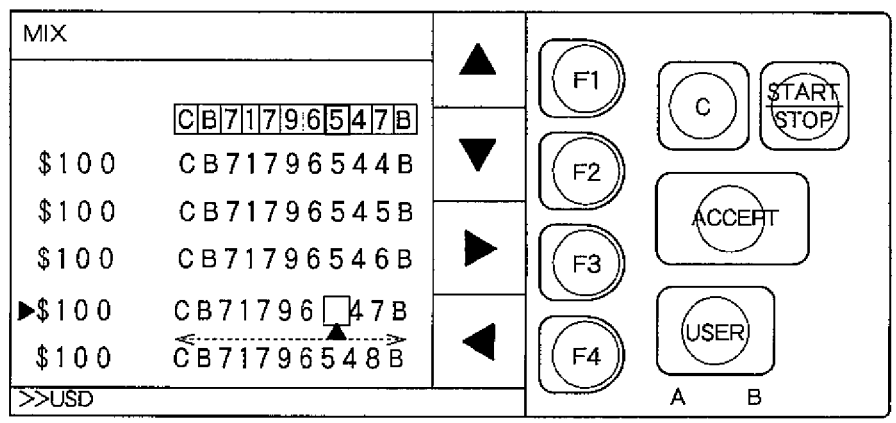
F I G. 8

PAPER SHEET HANDLING MACHINE AND PAPER SHEET HANDLING METHOD

CROSS REFERENCE TO RELATED APPLICATION

This application is based upon and claims benefit of priority from the Japanese Patent Application No. 2011-127166, filed on Jun. 7, 2011, the entire contents of which are incorporated herein by reference.

FIELD OF THE INVENTION

The present invention relates to a paper sheet handling machine and a paper sheet handling method, each adapted for reading a serial number printed on each paper sheet, such as a banknote or the like.

BACKGROUND OF THE INVENTION

Usually, on each of the paper sheets, such as the banknotes, checks, gift certificates or the like, the serial number (i.e., character information of a predetermined digit number including alphabetical letters and figures) is printed for identifying each paper sheet.

For instance, in financial institutions, one machine, which is adapted for character-identifying (or performing character identification for) the serial number of each banknote, registering each character-identified serial number at a database, and then managing the banknotes used in a certain transaction performed by using this machine, has been known in recent years (e.g., see JP2004-213559). In such a known machine, when some characters of a certain serial number are not identified, each part corresponding to such unidentified characters is rewritten and displayed by using an error letter (e.g., "?"). In this case, the user of this machine checks, visually, each actual banknote and then inputs, manually, each character corresponding to the error letter "?". However, for this checking and input operation, it is necessary for the user to keep or prepare each actual banknote at hand. Therefore, such a manual input operation for each error letter tends to lay a heavy burden on the user.

In order to reduce such a heavy burden on the user, another machine, which is adapted for registering each unidentified character, as an unaccepted character, at the database, without the need for the manual input operation or the like, when there are some character (or characters) that cannot be identified, has been known (e.g., see WO2010/032335A1). In this case, however, if there is some unaccepted character even for only one digit position included in a certain serial number, or even if there is only one digit position that has no character information for the characters constituting together the serial number, such information on the serial number should be registered, as unclear information, at the database.

Namely, in such conventional paper sheet handling machines as described above, the manual input operation for each error character tends to lay the heavy burden on the user, and there is a risk that some serial number may be registered, as the unclear information, at the database.

SUMMARY OF THE INVENTION

According to one aspect of the present invention, there is provided a paper sheet handling machine including: an imaging unit configured to take an image of a paper sheet and generate a paper sheet image; an identification unit configured to identify a character of each digit position included in a serial number, from a serial number region of the paper sheet image; an output unit configured to output the image of a part corresponding to the serial number region of the paper sheet image, when there is a digit position whose character therein cannot be identified by the identification unit; a display unit configured to display each character identified by the identification unit and the image outputted from the output unit; and an input unit configured to accept input of each character corresponding to the digit position whose character therein cannot be identified by the identification unit.

According to one aspect of the present invention, there is provided a paper sheet handling machine including: an imaging unit configured to take an image of a paper sheet and generate a paper sheet image; an identification unit configured to identify a character of each digit position included in a serial number, from a serial number region of the paper sheet image; an output unit configured to output a region image corresponding to the serial number region of the paper sheet image, when there is a digit position whose character therein cannot be identified by the identification unit; and a memory unit configured to store therein the serial number, all digits of which are respectively character-identified by the identification unit, wherein the memory unit stores therein each character identified by the identification unit, with the region image being associated with the character, when there is a position whose character therein cannot be identified by the identification unit.

According to one aspect of the present invention, there is provided a paper sheet handling machine including: a reception unit configured to take in paper sheets respectively put into the paper sheet handling machine, one by one; an imaging unit configured to take an image of each paper sheet taken in by the reception unit and generate a paper sheet image; an identification unit configured to identify a character of each digit position included in a serial number, from a serial number region of the paper sheet image; a first stacking unit and a second stacking unit, each configured to stack therein the paper sheets respectively character-identified, with respect to the serial number thereof, by the identification unit; a transport unit configured to transport the paper sheets from the reception unit to the first and second stacking units; a control unit configured to control the transport unit, such that first paper sheets, all digits of each serial number of which are respectively character-identified by the identification unit, are transported to the first stacking unit, and such that second paper sheets, one or more digits of each serial number of which are not character-identified by the identification unit, are transported to the second stacking unit; a memory unit configured to store therein each serial number of the first paper sheets that is character-identified by the identification unit; and a display unit configured to display the characters respectively included in each serial number of the second paper sheets and identified by the identification unit.

According to one aspect of the present invention, there is provided a paper sheet handling method including: taking an image of each paper sheet and generating a paper sheet image, by using an imaging unit; identifying a character of each digit position in a serial number, from a serial number region of the paper sheet image, by using an identification unit; extracting the image of a part corresponding to the serial number region from the paper sheet image and outputting the image of the part, when there is a digit position whose character therein cannot be identified by the identification unit; displaying each character identified by the identification unit, together with the outputted image; and inputting the character corresponding to each digit position whose character therein cannot be identified by the identification unit.

According to one aspect of the present invention, there is provided a paper sheet handling method including: taking an image of each paper sheet and generating a paper sheet image, by using an imaging unit; identifying a character of each digit position included in a serial number, from a serial number region of the paper sheet image, by using an identification unit; extracting a region image corresponding to the serial number region from the paper sheet image and outputting the region image, when there is a digit position whose character therein cannot be identified by the identification unit; storing each serial number, all digits of which are respectively character-identified by the identification unit, in a memory unit; and storing each character identified by the identification unit, with the region image being associated with the character, in the memory unit, when there is a digit position whose character therein cannot be identified by the identification unit.

According to one aspect of the present invention, there is provided a paper sheet handling machine including: an imaging unit configured to take an image and generate a paper sheet image; an identification unit configured to identify a character of each digit position included in a serial number, from a serial number region of the paper sheet image; and a list generating unit configured to generate and output a list of each serial number including a digit position whose character therein cannot be identified by the identification unit.

BRIEF DESCRIPTION OF THE DRAWINGS

FIG. 1 is a diagram for illustrating external appearance of one exemplary banknote handling machine related to one embodiment of the present invention;

FIG. 6 is a diagram for illustrating one example of a display screen;

FIG. 7 is a diagram for illustrating another example of the display screen;

FIG. 8 is a diagram for illustrating still another example of the display screen;

DESCRIPTION OF THE EMBODIMENTS

Hereinafter, one exemplary embodiment of the present invention will be described with reference to the drawings.

Figure 2:
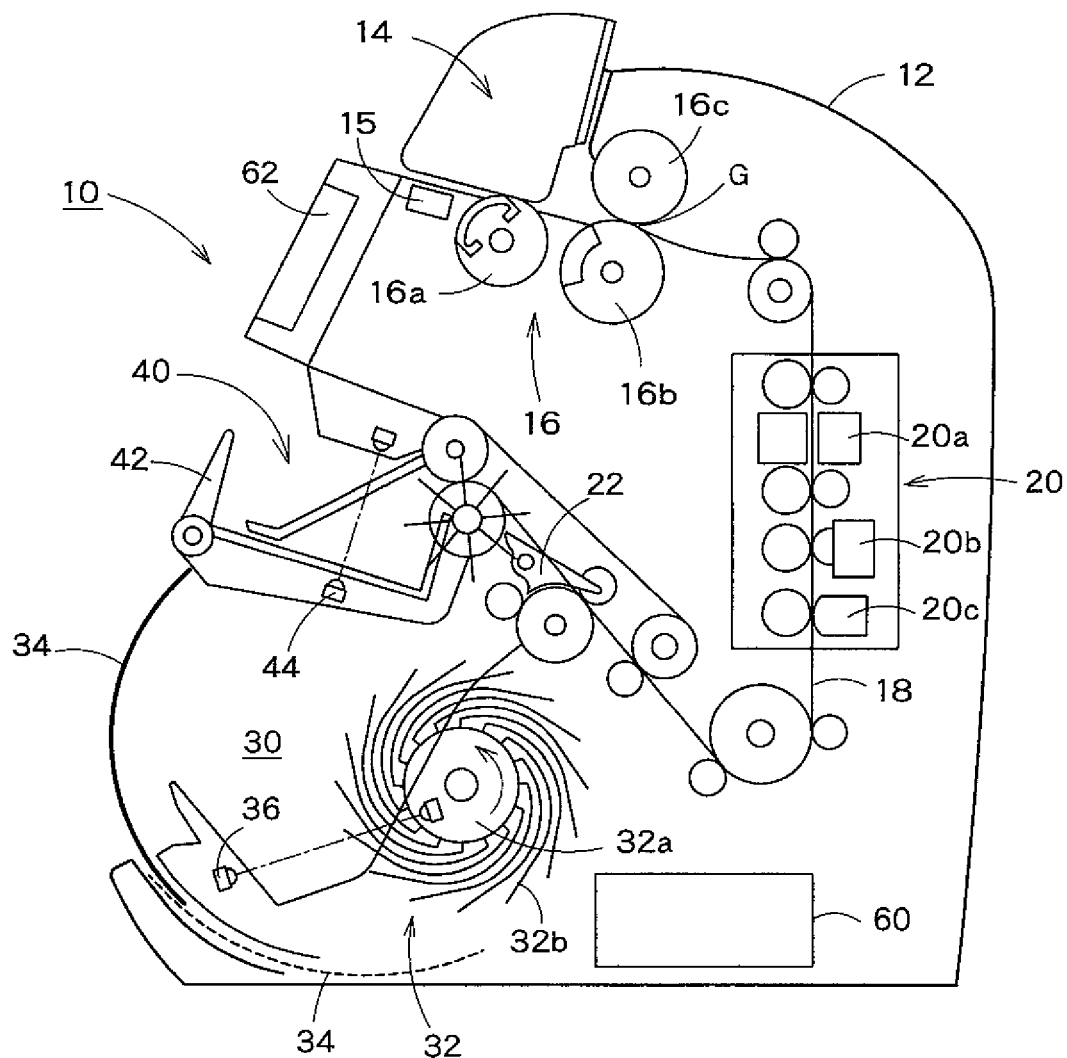
FIG. 2 is a diagram for schematically illustrating the interior of the banknote handling machine related to the embodiment of the present invention.
Figure 3:
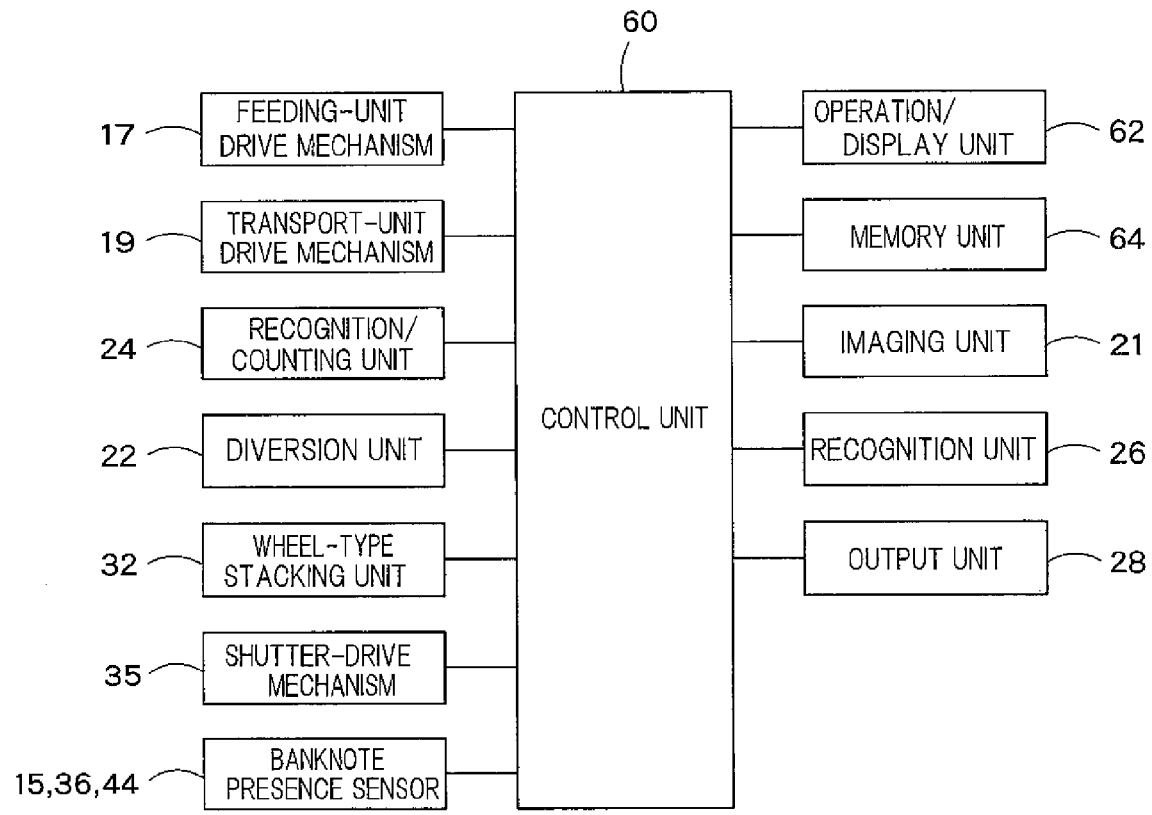
FIG. 3 is a block diagram for illustrating a control system provided for the banknote handling machine related to the embodiment of the present invention.

FIGS. 1 through 3 are provided for respectively illustrating the banknote handling machine related to the embodiment of the present invention. Of these drawings, FIG. 1 is a perspective view for illustrating one external appearance of the banknote handling machine, FIG. 2 is one diagram provided for schematically illustrating the interior of the banknote handling machine shown in FIG. 1, and FIG. 3 is one exemplary block diagram for illustrating the control system provided for the banknote handling machine shown in FIGS. 1 and 2.

As shown in FIGS. 1 and 2, the banknote handling machine 10 includes a casing 12, a placing unit (or hopper) 14 adapted for placing thereon a plurality of banknotes to be counted, in a stacked condition, a feeding unit 16 adapted for feeding out the banknotes, one by one, into the casing 12, from the banknote located at the lowermost layer among the banknotes respectively placed on the placing unit 14, and a transport unit 18 provided in the casing 12 and adapted for transporting the banknotes respectively fed into the casing 12 by the feeding unit 16, one by one. Further, a recognition unit 20 is provided to the transport unit 18. This recognition unit 20 is adapted for recognizing each banknote fed into the casing 12 by the feeding unit 16.

The feeding unit 16 has a kicker roller 16a provided to be in contact with one face of the banknote located at the lowermost layer among the banknotes respectively placed, in the stacked condition, on the placing unit 14, and a feed roller 16b located on the downstream side relative to the kicker roller 16a in the feed direction of the banknotes and adapted for feeding out each banknote kicked out by the kicker roller 16a, into the casing 12. In addition, a reverse rotation roller (or gate roller) 16c is located in a position opposite to the feed roller 16b. In this case, a gate part G is provided between the feed roller 16b and the reverse rotation roller 16c. With this configuration, the banknotes, respectively kicked out by the kicker roller 16a, are fed out, one by one, toward the transport unit 18 in the casing 12, through the gate part G. Further, a feeding-unit drive mechanism 17 (see FIG. 3) adapted for driving the feeding unit 16 is provided in the casing 12.

In addition, as shown in FIG. 2, a banknote presence sensor 15 is provided to the placing unit 14. This banknote presence sensor 15 can serve to detect presence or absence of the banknotes on the placing unit 14. More specifically, the banknote presence sensor 15 is a reflection-type optical sensor including a light emission section and a light reception section, which are integrally provided in the sensor. In this case, when some banknotes are present on the placing unit 14, light emitted from the light emission section can reach the light reception section, after reflected by the banknotes. Meanwhile, when there are no banknotes on the placing unit 14, the light is not reflected by the banknotes, thus cannot reach the light reception section. With this configuration, the banknote presence sensor 15 can detect the presence or absence of the banknotes on the placing unit 14.

In the banknote handling machine 10 of this embodiment, the placing unit 14, banknote presence sensor 15 and feeding unit 16 constitute together a reception unit adapted for receiving therein the plurality of banknotes, one by one, in order to take them into the machine 10.

The transport unit 18 is composed of a plurality of combinations of a plurality of transport rollers and a transport belt provided over the transport rollers. In this case, each banknote is held between each transport belt and the transport rollers and transported by circulation of the transport belt along each transport path. Additionally, a transport-unit drive mechanism 19 (see FIG. 3) adapted for driving the transport unit 18 is provided in the casing 12.

Further, as described above, the recognition unit 20 adapted for recognizing each banknote fed into the casing 12 by the feeding unit 16 is provided to the transport unit 18. As shown in FIG. 2, the recognition unit 20 includes an image scanner (or line sensor) 20a, a thickness detection sensor 20b and a magnetic sensor 20c, wherein such sensors 20a, 20b and 20c are arranged in a line. The image scanner 20a is composed of a light irradiation section (or light emission element) and a proper light reception section, wherein the light irradiation section is adapted for irradiating each banknote transported by the transport unit 18, with several kinds of light, such as visible light, infrared light, green light and the like.

More specifically, in this image scanner 20a, the light irradiation section can serve to successively irradiate each banknote transported by the transport unit 18, with the several kinds of light, at a predetermined pitch, and the light reception section can serve to successively receive the light reflected by the banknote, and then combining such received light together. In this way, the images of the face and back of each banknote can be generated, respectively. An imaging unit 21 is provided for taking the so-generated images of each banknote.

Further, in the image scanner 20a, the irradiation section irradiates each banknote with the infrared light, and then the light reception section receives the light transmitted through the face and back of the banknote. In this way, a transmitted-infrared-light image of each banknote can be obtained.

The magnetic sensor 20c of the recognition unit 20 is provided for detecting magnetic distribution over the face and back of each banknote. Namely, the magnetic distribution in each banknote can be detected and obtained by this magnetic sensor 20c.

Accordingly, the imaging unit 21 can serve to generate the image of each banknote (or each banknote image), by using the images of the face and back of the banknote transported by the transport unit 18. Thereafter, each banknote image generated by the imaging unit 21 is fed to an identification unit 26 (see FIG. 3) adapted for identifying the serial number (as will be described later) of the banknote.

The thickness detection sensor 20b of the recognition unit 20 is provided for detecting the thickness of each banknote passing through this sensor 20b. More specifically, this thickness detection sensor 20b can serve to detect a folded banknote, some banknotes overlapped one on another or those each having a tape or the like attached thereto, based on the thickness of each detected banknote.

Further, a recognition/counting unit 24 (see FIG. 3) is provided to the banknote handling machine 10. This recognition/counting unit 24 is adapted for recognizing the denomination, authenticity, fitness or the like of each banknote and/or recognizing whether or not some transport error of the banknotes occurs as well as for counting the number of the banknotes, based on each banknote image and/or magnetic distribution detected by the recognition unit 20 as well as on each detection result obtained from the thickness detection sensor 20b.

As shown in FIG. 2, the transport unit 18 is bifurcated into two transport paths at a point on the downstream side relative to the recognition unit 20, wherein one transport path has a downstream-side end connected with a stacking unit 30, and the other transport path has the downstream-side end connected with a reject unit 40. With this configuration, the banknotes respectively recognized by the recognition unit 20 are fed, selectively, to the stacking unit 30 or reject unit 40.

One opening is provided in a front face (or one face located on the left side in FIG. 2) of the stacking unit 30, such that an operator can optionally take out the banknotes, respectively stacked in the stacking unit 30, via the opening. Further, another opening is provided in a front face of the reject unit 40, such that the operator can optionally take out the banknotes, respectively stacked in the reject unit 40, via this opening.

As shown in FIG. 2, a diversion unit 22 composed of a diverter and a drive unit (not shown) for the diverter is provided at the point where the transport unit 18 is bifurcated into the two transport paths. With the provision of this diversion unit 22, the banknotes respectively fed to the diversion unit 22 from the upstream side thereof can be selectively fed to either one of the two transport paths.

A wheel-type stacking mechanism 32 is provided in a position on the back-face side in the stacking unit 30 (or position on the right side in the stacking unit 30 in FIG. 2) located in the casing 12. This wheel-type stacking mechanism 32 is composed of a stacking wheel 32a and a drive unit (not shown) for the stacking wheel 32a. In this case, the stacking wheel 32a is rotated, in an anticlockwise direction in FIG. 2 (i.e., in a direction expressed by an arrow depicted in FIG. 2), about an axis extending orthogonally to the sheet of FIG. 2 in an approximately horizontal direction. To the stacking wheel 32a, a plurality of vanes 32b are provided to extend outwardly from the outer circumferential face of the wheel 32a, in a direction reverse to the rotation direction of the wheel 32a (i.e., in a clockwise direction in FIG. 2). Further, as shown in FIG. 2, such vanes 32b are respectively located with an equal interval around the outer circumferential face of the stacking wheel 32a.

As described above, the stacking wheel 32a of the wheel-type stacking mechanism 32 is designed to be always rotated in the anticlockwise direction in FIG. 2, during the operation of the banknote handling machine 10. In this case, the banknotes are fed to the stacking wheel 32a, one by one, from the transport unit 18. Then, the stacking wheel 32a receives each banknote fed from the transport unit 18 between two of the vanes 32b of the wheel 32a. Thereafter, each banknote received between the two of the vanes 32b of the stacking wheel 32a is fed to the stacking unit 30. In this way, the banknotes are fed to the stacking unit 30, one by one, from the stacking wheel 32a, and then stacked, in an arranged condition, in the stacking unit 30.

As shown in FIGS. 1 and 2, a shutter 34 adapted for closing the opening provided in the front face of the stacking unit 30 is provided to the banknote handling machine 10. With the provision of this shutter 34, the opening in the front face of the stacking unit 30 can be optionally closed. In addition, a shutter drive mechanism 35 (see FIG. 3) adapted for driving the shutter 34 is provided in the interior of the casing 12. In this case, the shutter 34 is driven by the shutter drive mechanism 35, between an opening position (i.e., a position expressed by a dotted line depicted in FIG. 2) in which the shutter 34 is evacuated downward relative to the stacking unit 30 in order to open the opening of the stacking unit 30, and a closing position (i.e., a position expressed by a solid line depicted in FIG. 2) in which the shutter 34 closes the opening provided in the front face of the stacking unit 30. Namely, when the shutter 34 is in the opening position as expressed by the dotted line depicted in FIG. 2, the operator can access the banknotes stacked in the stacking unit 30. Meanwhile, when the shutter 34 is in the closing position as expressed by the solid line depicted in FIG. 2, the opening in the front face of the stacking unit 30 is closed by the shutter 34, as such the operator cannot access the banknotes stacked in the stacking unit 30.

Another banknote presence sensor 36 is provided to the stacking unit 30. This banknote presence sensor 36 can serve to detect the presence or absence of the banknotes in the stacking unit 30. More specifically, the banknote presence sensor 36 includes the light emission section and light reception section. In this case, when there are no banknotes stacked in the stacking unit 30, the light emitted from the light emission section is received by the light reception section. Meanwhile, when some banknotes are present in the stacking unit 30, the light emitted from the light emission section is blocked by the banknotes, and thus cannot reach the light reception section. Therefore, with such blocking of the light, the banknote presence sensor 36 can detect the banknotes stacked in the stacking unit 30.

The reject unit 40 has no shutter for closing the opening provided in the front face of this unit 40. Instead, as shown in FIGS. 1 and 2, a pair of left and right banknote arrangement members 42 are provided to the reject unit 40. Each banknote arrangement member 42 is designed to be brought down, manually by the operator, in a forward direction (i.e., in a leftward direction in FIG. 2) relative to the casing 12, from a position shown in FIG. 2. With this configuration, the banknotes, respectively fed to the reject unit 40 from the transport unit 18, can be once stacked in the reject unit 40, in the arranged condition, by each banknote arrangement member 42. Then, by bringing down each banknote arrangement member 42 in the forward direction relative to the casing 12, the operator can take out the banknotes from the reject unit 40.

Still another banknote presence sensor 44 is provided to the reject unit 40. This banknote presence sensor 44 can serve to detect the presence or absence of the banknotes in the reject unit 40. More specifically, the banknote presence sensor 44 includes the light emission section and light reception section. In this case, when there are no banknotes stacked in the reject unit 40, the light emitted from the light emission section is received by the light reception section. Meanwhile, when some banknotes are present in the reject unit 40, the light emitted from the light emission section is blocked by the banknotes, and thus cannot reach the light reception section. Therefore, with such blocking of the light, the banknote presence sensor 44 can detect the banknotes stacked in the reject unit 40.

Further, as shown in FIG. 1, an operation/display unit 62 is provided to the front face of the casing 12. This operation/display unit 62 includes a display section 62a composed of a display device, such as an LCD or the like, and a plurality of operation keys 62b. The display section 62a can serve to display the serial number of each banknote identified by the identification unit 26 and/or image of a part corresponding to a serial number region of each banknote image generated by the imaging unit 21. In addition, when the operator pushes down some proper operation keys 62b, the character corresponding to each digit position that cannot be character-identified by the identification unit 26 can be inputted.

The identification unit 26 shown in FIG. 3 is provided for extracting the serial number region from each banknote image generated by the imaging unit 21, identifying the character of each digit position of the serial number from the extracted serial number region, and obtaining the serial number of the predetermined digit number printed on each banknote. Thereafter, the identification unit 26 serves to output each identified character to the operation/display unit 62. Thus, the serial number identified by the identification unit 26 can be displayed on the display section 62a.

When there is some digit position (or digit positions) whose character therein cannot be identified by the identification unit 26, an output unit 28 shown in FIG. 3 can serve to output the image of the corresponding serial number region to the operation/display unit 62. With this output operation, when there is some digit position whose character therein cannot be identified by the identification unit 26, the image of the corresponding serial number region of a certain banknote can be displayed on the display section 62a of the operation/display unit 62, together with the characters respectively identified by the identification unit 26. As such, by checking the image of the serial number region displayed on the display section 62a, the operator can input each character corresponding to the digit position whose character therein cannot be identified by the identification unit 26, via each corresponding operation key 62b.

Figure 4:
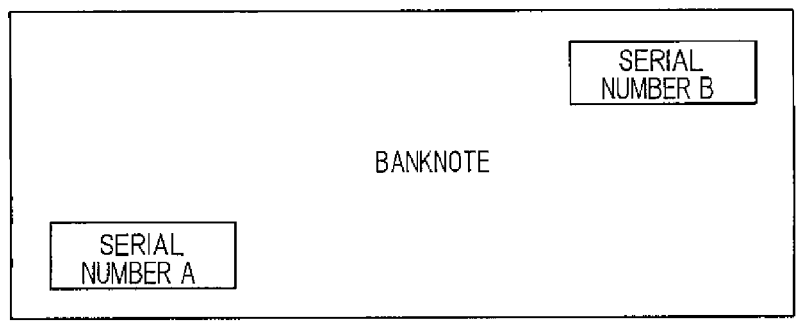
FIG. 4 is a diagram for illustrating one exemplary positional relationship among a plurality of serial numbers respectively printed on one banknote.

FIG. 4 shows one example of the positional relationship among the plurality of serial numbers respectively printed on one banknote. As shown in FIG. 4, the serial numbers, each printed in the predetermined digit number for the recognition of the banknote, are located in a plurality of positions of the banknote. For instance, one serial number A is printed on a left lower end of the banknote, and another serial number B is printed on a right upper end of the banknote. In this case, the serial numbers A and B are respectively provided to express the same contents.

As shown in FIG. 4, when the plurality of serial numbers are printed on one banknote, the identification unit 26 serves to check whether or not the identification result on the characters (i.e., the character-identification result) of the serial number A matches with the character-identification result on the serial number B. As a result, if the character-identification result on the serial number A matches with the character-identification result on the serial number B, then each character-identification result will be judged or determined as the serial number of the checked banknote.

Meanwhile, if the character-identification result on the serial number A does not match with the character-identification result on the serial number B, then each digit of the serial number A that matches with each corresponding digit of the serial number B will be judged, as a character-identified digit (or digit position whose character therein can be identified), by the identification unit 26. Meanwhile each digit of the serial number A that does not match with each corresponding digit of the serial number B will be judged as a character-unidentified digit (or digit position whose character therein cannot be identified).

In the case in which some digit position whose character therein cannot be identified is included in either one of the character-identification result on the serial number A or character-identification result on the serial number B, the identification unit 26 may serve to adopt the other character-identification result, or may serve to judge the character corresponding to the digit position, as one that cannot be identified.

It is noted that various methods can be used as a method by which the identification unit 26 serves to identify and judge the serial number of each banknote.

For instance, when there is some digit position whose character therein cannot be identified by the identification unit 26, it is preferred that the output unit 28 serves to output both of the image of the serial number region of the serial number A and the image of the serial number region of the serial number B to the operation/display unit 62. However, the output unit 28 may serve to output only one of the two images to the operation/display unit 62.

Further, as shown in FIG. 2, a control unit 60 is provided in the casing 12. This control unit 60 can serve to control each component of the banknote handling machine 10. As shown in FIG. 3, the control unit 60 is connected with the feeding-unit drive mechanism 17 adapted for driving the feeding unit 16, as well as connected with the transport-unit drive mechanism 19 adapted for driving the transport unit 18. Further, the control unit 60 is connected with the imaging unit 21, diversion unit 22, recognition/counting unit 24, identification unit 26, output unit 28, wheel-type stacking mechanism 32, shutter drive mechanism 35 adapted for driving the shutter 34, as well as connected with the banknote presence sensors 15, 36, 44, operation/display unit 62, and a memory unit 64 and the like.

In this case, the control unit 60 can serve to deliver a recognition and count result on each banknote obtained by the recognition/counting unit 24 as well as deliver the identification result on each serial number obtained by the identification unit 26. Further, the control unit 60 can serve to send a command signal to each of the feeding-unit drive mechanism 17, transport-unit drive mechanism 19, diversion unit 22, wheel-type stacking mechanism 32, shutter drive mechanism 35, operation/display unit 62 and the like, in order to control such components. Additionally, the control unit 60 can serve to receive each detection result obtained by and sent from the respective banknote presence sensors 15, 36, 44.

Further, as shown in FIG. 3, the memory unit 64 is connected with the control unit 60. For instance, this memory unit 64 can serve to store therein the recognition and count result on each banknote obtained by the recognition/counting unit 24, the characters of each serial number identified by the identification unit 26, the characters respectively inputted via the operation keys 62b, and the like. In addition, the memory unit 64 can serve to store therein the image of each serial number region outputted from the output unit 28, with the characters respectively identified by the identification unit 26 and the characters respectively inputted via the operation keys 62b being respectively associated with the image.

Figure 5:
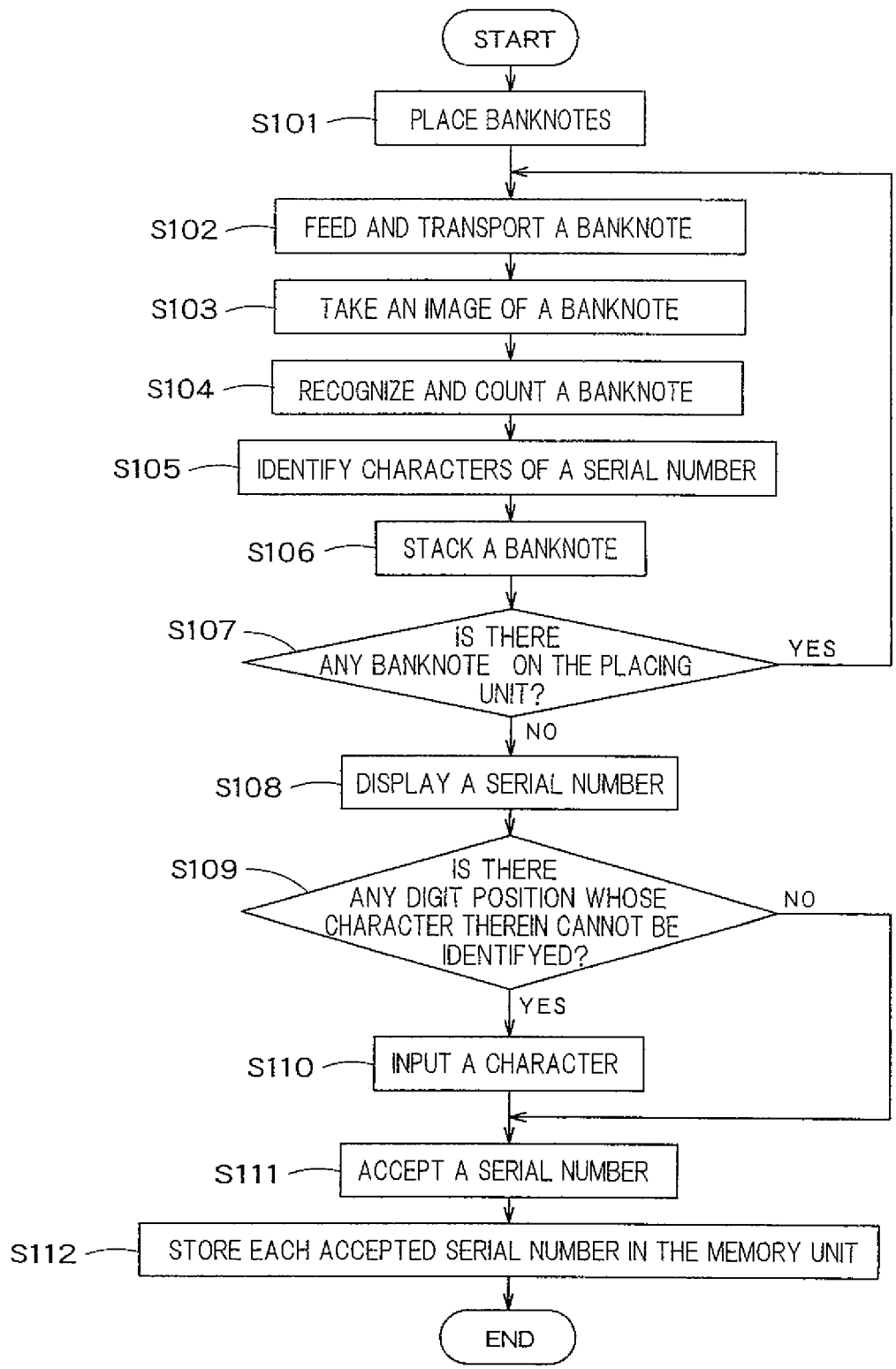
FIG. 5 is a flow chart for illustrating one banknote handling method related to the embodiment of the present invention.

Now, referring to the flow chart shown in FIG. 5, one banknote handling method using the banknote handling machine 10 constructed as described above will be discussed. In this method, the operation of the banknote handling machine 10 is performed by using the control unit 60 for controlling each component of this banknote handling machine 10.

(Step S101)

The banknotes to be counted and identified on the serial number thereof are placed, respectively, in the stacked condition, on the placing unit 14.

(Step S102)

When the operator pushes down a proper operation key (or keys) 62b (e.g., a START/STOP key shown in FIG. 6) of the operation/display unit 62 in order to send a command for starting a counting operation for the banknotes to the control unit 60, the banknotes placed, in the stacked condition, on the placing unit 14 are fed out, successively, one by one, from the banknote located at the lowermost layer, to the transport unit 18 in the casing 12, by the feeding unit 16. Then, the banknotes respectively fed to the transport unit 18 in the casing 12 by the feeding unit 16 are transported by the transport unit 18, respectively.

(Step S103)

The image of each banknote transported by the transport unit 18 is taken by the imaging unit 21, in order to generate the banknote image.

(Step S104)

The recognition/counting unit 24 recognizes the denomination, authenticity, fitness or the like of each banknote and/or recognizes whether or not some transport error of the banknotes occurs, as well as counts the banknotes, based on each banknote image generated in the step S103 as well as on each detection result obtained by the thickness sensor 20b.

(Step S105)

The identification unit 26 extracts the serial number region from each banknote image generated in the step S103, and then identifies the character of each digit position by using the image of the extracted serial number region.

(Step S106)

Each banknote is transported to the stacking unit 30 or reject unit 40 and stacked therein. At this time, the control unit 60 determines each banknote to be stacked in either one of the stacking unit 30 or reject unit 40, based on the recognition result obtained by the recognition/counting unit 24 or on the identification result obtained by the identification unit 26, and then controls the diversion unit 22.

For instance, if the recognition result related to a certain banknote and obtained by the recognition/counting unit 24 shows that this banknote is a counterfeit banknote, the control unit 60 determines that such a banknote is to be transported to the reject unit 40. Meanwhile, if the recognition result shows that the banknote is a genuine banknote, the control unit 60 determines that this banknote is to be transported to the stacking unit 30.

Further, if some digit position whose character therein cannot be identified by the identification unit 26 is included in the serial number of a certain banknote, the control unit 60 determines that this banknote is to be transported to the reject unit 40. Meanwhile, if all digit positions of the serial number of a certain banknote can be character-identified by the identification unit 26, the control unit 60 determines that this banknote is to be transported to the stacking unit 30.

When the destination to which the banknotes are transported is the stacking unit 30, the banknotes are fed, one by one, from the transport unit 18 to the stacking wheel 32a of the wheel-type stacking mechanism 32. Then, the stacking wheel 32a receives each banknote fed from the transport unit 18 between the two of the vanes 32b thereof, and feeds the banknote received between the two of the vanes 32b into the stacking unit 30. In this way, the banknotes can be stacked, respectively, in the arranged condition, in the stacking unit 30 by the wheel-type stacking mechanism 32.

During a period in which the recognition and counting operations for the banknotes and the identification on each serial number are respectively performed, as described above, in the banknote handling machine 10, the opening in the front face of the stacking unit 30 is closed by the shutter 34, as shown by the solid line depicted in FIG. 2. Meanwhile, since the opening in the front face of the reject unit 40 is always opened, the operator can optionally take out the banknotes from the reject unit 40, by bringing down each banknote arrangement member 42 in the forward direction relative to the casing 12. It is noted that the operator can optionally set the shutter 34 opened or closed during the operation of the banknote handling machine 10.

(Step S107)

If the banknotes are still placed on the placing unit 14, the procedure returns to the step S102. Meanwhile, if all of the banknotes are fed out, the procedure goes to a step S108.

(Step S108)

Each recognition and count result sent from the recognition/counting unit 24 and the identification result on each serial number sent from the identification unit 26 are displayed on the display section 62a, respectively.

(Step S109)

If all digit positions of the serial numbers for all of the banknotes can be character-identified by the identification unit 26, the procedure goes to a step S111. Meanwhile, if there is some digit position (or digit positions) whose character therein cannot be identified by the identification unit 26, the procedure goes to a step S110.

FIG. 7 shows one example of the display on the display section 62a, for the recognition and count result obtained by the recognition/counting unit 24 and each identification result on several serial numbers obtained by the identification unit 26. In this case, one digit position that cannot be character-identified by the identification unit 26 is expressed by a blank. Further, as shown in FIG. 7, the recognition and count result is shown for expressing ten (10) sheets of one-hundred (100) dollar banknotes and one thousand (1000) dollars in total.
(Step S110)

The operator inputs the character of the digit position whose character therein cannot be identified by the identification unit 26.

More specifically, the operator first pushes an F4 key corresponding to "SERIAL" shown in FIG. 7. With this operation, the display screen of the display section 62a is changed into the screen as shown in FIG. 8.

Then, the operator pushes each of F1 to F4 keys, in order to shift a cursor to a position corresponding to the digit (or blank digit) that cannot be character-identified by the identification unit 26. Once the cursor is moved to the blank digit, one image P of the serial number region corresponding to the serial number related to this input operation is displayed at an upper portion of the display section 62a.

Figure 9:
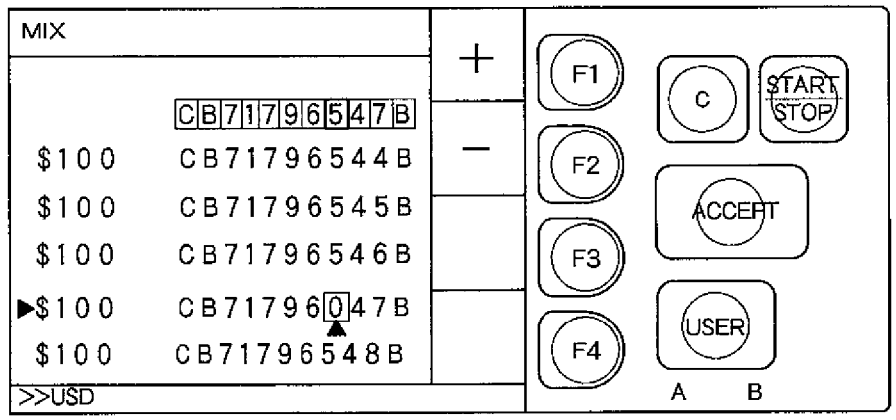
FIG. 9 is a diagram for illustrating still another example of the display screen.

Subsequently, the display screen of the display section 62a is changed into the screen as shown in FIG. 9. Then, the operator pushes the F1 key or F2 key, while checking the image P, in order to match the character corresponding to the blank digit with the character that the operator wants to input. For instance, each time the F1 key is pushed, the character corresponding to the blank digit is changed into 0, 1, 2, . . . , 8, 9, A, B, C, . . . , X, Y, Z. Meanwhile, each time the F2 key is pushed, this character is changed into Z, Y, X, . . . , C, B, A, 9, 8, . . . , 2, 1, 0.

Figure 10:
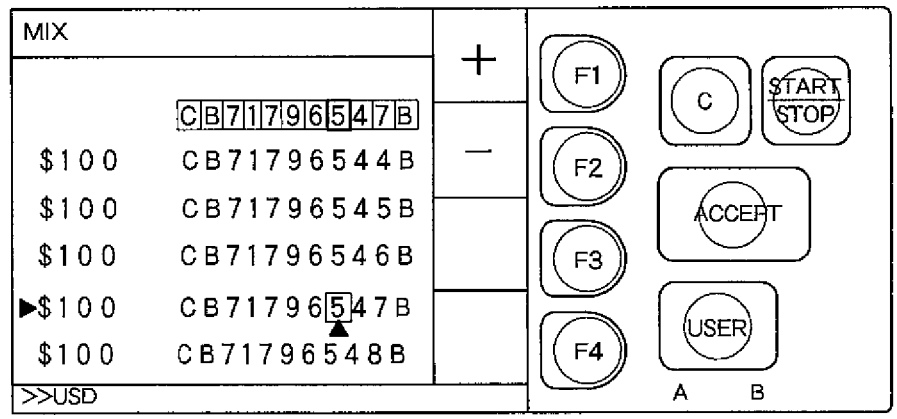
FIG. 10 is a diagram for illustrating still yet another example of the display screen.
Figure 11:
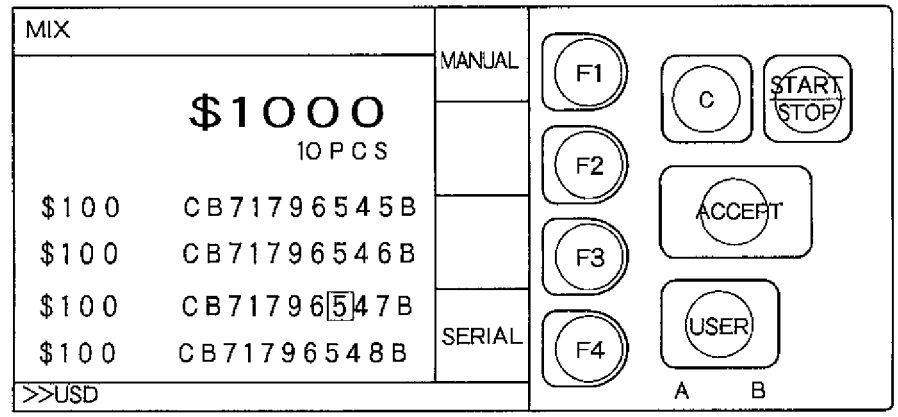
FIG. 11 is a diagram for illustrating still yet another example of the display screen.

Then, as shown in FIG. 10, once the character corresponding to the blank digit is changed into the character that the operator wants to input, the operator pushes an ACCEPT key in order to input the so-changed character. In this way, as shown in FIG. 11, the serial number composed of a combination of the characters respectively identified by the identification unit 26 and the character inputted by the operator is generated.

In the case in which there are a plurality of serial numbers respectively including the digit position whose character therein cannot be identified, the operation of this step is performed a predetermined number of times corresponding to the number of the serial numbers respectively including the digit position whose character therein cannot be identified.
(Step S111)

Figure 12:
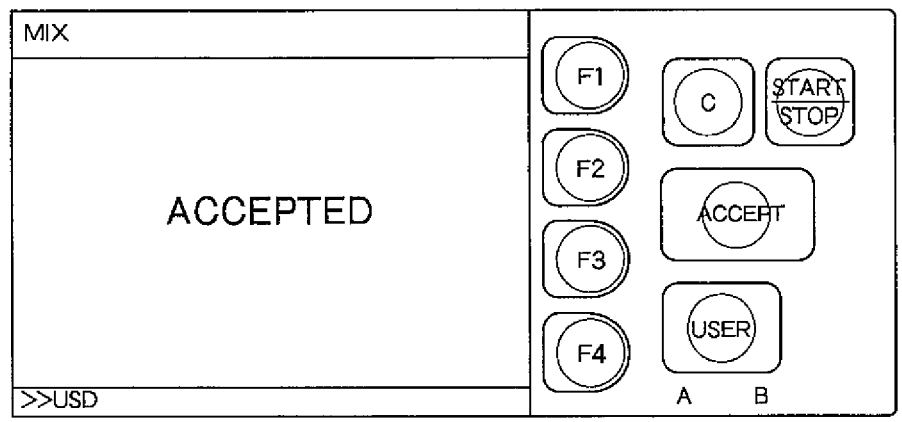
FIG. 12 is a diagram for illustrating still yet another example of the display screen.

In this step, when the operator pushes a certain operation key 62b (e.g., the ACCEPT key as shown in FIGS. 6 to 11), each serial number is accepted for all of the banknotes. Once the display screen as shown in FIG. 12 is displayed on the display section 62a, the display screen is changed back to a waiting screen (see FIG. 6).
(Step S112)

Each accepted serial number is stored in the memory unit 64. At this time, each serial number may be stored in the memory unit 64, with the recognition result on the corresponding banknote being associated with this serial number. With this operation, when a certain serial number stored in the memory unit 64 is searched, the recognition result of the corresponding banknote can also be known.

For each serial number including some digit that is inputted by the operator in the step S110, the serial number may be stored in the memory unit 64, with a flag being set for this serial number. With this operation, when a certain serial number stored in the memory unit 64 is searched, whether or not the serial number includes some digit that is inputted by the operator can be known.

Alternatively, for each serial number including some digit that is inputted by the operator in the step S110, the serial number may be stored in the memory unit 64, together with the image of the serial number region of the corresponding banknote. With this operation, the serial number including some digit that is inputted by the operator can be checked again, with the image of the serial number region being referred to.

As described above, according to this embodiment, when some digit position whose character therein cannot be identified by the identification unit 26 is included in the serial number of a certain banknote, the operator can input the character corresponding to this digit position, while checking the image of the corresponding serial number region displayed on the display section 62a. At this time, since there is no need for the operator, for preparing, at hand, each banknote having the serial number including some digit position whose character therein cannot be identified, the burden of the character-input operation on the operator can be reduced so much. Further, for each digit position whose character therein cannot be identified by the identification unit 26, the character corresponding to such a digit position is inputted by the operator, with the image of the corresponding serial number region being checked by the operator. Therefore, the accuracy and reliability of the serial number of each banknote stored in the memory unit 64 can be substantially enhanced. Additionally, since only the image of each serial number region is displayed in place of the entire image of each corresponding banknote, each character can be visually confirmed with ease by the operator, even in the case in which the display section 62a is provided as a relatively small screen.

In the embodiment described above, each character is inputted, manually, by the operator, by using some proper operation key (or keys) 62b. However, for each digit of the serial number that cannot be character-identified by the identification unit 26, the operator may input each character, by voice (sound), by using an appropriate voice (sound) identification function provided to the banknote handling machine 10.

Further, in the embodiment described above, when the operator performs the character-input operation, the image of each corresponding serial number region is displayed on the display section 62a. However, a proper character may be displayed, as a candidate character for the digit position whose character therein cannot be identified by the identification unit 26. In this case, when there is some digit position that cannot be identified upon the character identification, the identification unit 26 can obtain at least one candidate character as the candidate for such a digit position. Thus, by displaying such a candidate character on the display section 62a, the burden of the character-input operation on the operator can be further reduced.

In addition, the banknote handling machine 10 may include a printing unit adapted for printing and outputting the recognition and count result obtained by the recognition/counting unit 24, the identification result on each serial number obtained by the identification unit 26, and the characters respectively inputted by the operator.

In the embodiment described above, when some digit position whose character therein cannot be identified by the identification unit 26 is included in the serial number of a certain banknote, the operator inputs each character corresponding to the digit position, while checking the image of the corresponding serial number region displayed on the display section 62a. However, this character-input operation of the operator may be omitted. In this case, the output unit 28 serves to output the image (or region image) of the serial number region of the banknote having the serial number including some digit position whose character therein cannot be identified by the identification unit 26, and then the control unit 60 serves to write this region image in the memory unit 64, with the characters, respectively identified by the identification unit 26, being respectively associated with the region image.

Namely, with this operation, each serial number including some digit position whose character therein cannot be identified is stored in the memory unit 64, together with the region image. Accordingly, this operation can prevent serial number information stored in the memory unit 64 from being unclear. Further, since the character-input operation of the operator can be omitted, the burden on the operator can be further reduced.

In addition, the output unit 28 may serve to extract and output the image of a part (part image) corresponding to each digit that cannot be character-identified by the identification unit 26, from the region image, and then this part image may be stored in the memory unit 64, with the characters, respectively identified by the identification unit 26, being respectively associated with the part image. With this operation, since the data size of the image stored in the memory unit 64 can be substantially reduced, the serial number information stored in the memory unit 64 can be increased so much. Further, when a plurality of digit positions whose characters therein cannot be identified by the identification unit 26 are included in one serial number, the output unit 28 will serve to output a plurality of part images. Therefore, in this case, each part image is stored in the memory unit 64, with each corresponding digit being associated with this part image.

The aforementioned printing unit may be provided to print and output each serial number, with each part image being fitted in the corresponding digit position whose character therein cannot be identified by the identification unit 26.

In the embodiment described above, when some digit position whose character therein cannot be identified by the identification unit 26 is included in the serial number of a certain banknote, this banknote may be stacked in the reject unit 40, with only the characters of the serial number of this banknote that can be respectively identified by the identification unit 26 and the image of the corresponding serial number region being respectively displayed on the display section 62a, in a properly arranged condition. With this operation, when it is difficult for the operator to decipher the characters from the image displayed on the display section 62a, the operator can readily take out and check the actual banknote.

Further, in the above embodiment, one example as shown in FIG. 7 has been described, wherein several serial numbers, all digits of each of which are respectively character-identified by the identification unit 26 and a certain serial number including one digit that cannot be character-identified are displayed, respectively, without any discrimination. However, such serial numbers may be displayed with some discrimination. For instance, the serial number including some digit position whose character therein cannot be identified may be displayed at an upper portion of the display section 62a, while the serial numbers, all digit positions of each of which are respectively character-identified may be displayed at a lower portion of the display section 62a. Alternatively, the display section 62a may serve to selectively (or switchably) display thereon the serial number including some digit position whose character therein cannot be identified and the serial numbers, all digit positions of each of which are respectively character-identified, depending on the input operation via the operation keys 62b. In addition, a list generating unit may be provided to the banknote handling machine 10. This list generating unit is adapted for generating a list for showing only the serial numbers, each including some digit position whose character therein cannot be identified by the identification unit 26, by using the character-identification result obtained by the identification unit 26, as well as adapted for allowing the generated list to be displayed on the display section 62a.

In the embodiment described above, the banknote handling machine 10, adapted for identifying the serial number of each banknote and storing the identified serial number in the memory unit 64, has been described by way of example. However, it is should be appreciated that this banknote handling machine 10 may also be applied to another machine adapted for identifying each serial number printed on other paper sheets than the banknotes, such as the checks, gift certificates or the like, and storing therein the identified serial number.

It should be noted that the present invention is not limited to the exact forms of the embodiment described and illustrated herein, but should be construed to cover all modifications, without departing from the scope thereof. Further, it should be appreciated that various inventions can be made by any suitable combination of the plurality of components respectively disclosed in the above embodiment. For instance, several components may be removed from all of the components respectively disclosed in the above embodiment. In addition, the components respectively disclosed in different embodiments may be properly combined together.

What is claimed is:

1. A paper sheet handling machine comprising:
an imaging unit configured to take an image of a paper sheet and generate a paper sheet image;
an identification unit configured to identify a character of each digit position included in a serial number, from a serial number region of the paper sheet image;
an output unit configured to output the image of a part corresponding to the serial number region of the paper sheet image, when there is a digit position whose character therein cannot be identified by the identification unit;
a display unit configured to display each character identified by the identification unit and the image output from the output unit;
an input unit configured to accept input of each character corresponding to the digit position whose character therein cannot be identified by the identification unit; and
a memory unit configured to store therein the serial number of the paper sheet together with a flag, the serial number of the paper sheet being generated by combining each character identified by the identification unit with each character input via the input unit, the flag indicating that the serial number includes a digit input by an operator.

2. The paper sheet handling machine according to claim 1, wherein
the identification unit obtains at least one candidate character corresponding to each digit position whose character therein cannot be identified; and
the display unit displays the candidate character, together with the image output from the output unit.

3. The paper sheet handling machine according to claim 1, further comprising a memory unit configured to store therein the serial number of the paper sheet generated by combining each character identified by the identification unit with each character input via the input unit, together with the image output from the output unit.

4. The paper sheet handling machine according to claim 1, wherein the input unit accepts manual input or sound input.

5. The paper sheet handling machine according to claim 1, wherein the display unit displays one serial number, all digits of which are respectively character-identified by the identification unit, separately from another serial number including a digit position whose character therein cannot be identified.

6. A paper sheet handling machine comprising:
an imaging unit configured to take an image of a paper sheet and generate a paper sheet image;
an identification unit configured to identify a character of each digit position included in a serial number, from a serial number region of the paper sheet image;
an output unit configured to output a region image corresponding to the serial number region of the paper sheet image, when there is a digit position whose character therein cannot be identified by the identification unit; and
a memory unit configured to store therein the serial number, all digits of which are respectively character-identified by the identification unit, wherein
the memory unit stores therein each character identified by the identification unit, with the region image being associated with the character, when there is a position whose character therein cannot be identified by the identification unit;
the output unit extracts a part image corresponding to each digit position whose character therein cannot be identified by the identification unit from the serial number region of the paper sheet image, and outputs the part image; and
the memory unit stores therein the part image, such that each corresponding position whose character therein cannot be identified by the identification unit, is associated with the part image.

7. The paper sheet handling machine according to claim 6, further comprising a printing unit configured to print each serial number that is character-identified by the identification unit, wherein
when there is a digit position whose character therein cannot be identified by the identification unit, the printing unit prints the serial number with the part image being fitted in the digit position.

8. A paper sheet handling machine comprising:
a reception unit configured to take in paper sheets respectively put into the paper sheet handling machine, one by one;
an imaging unit configured to take an image of each paper sheet taken in by the reception unit and generate a paper sheet image;
an identification unit configured to identify a character of each digit position included in a serial number, from a serial number region of the paper sheet image;
a first stacking unit and a second stacking unit, each configured to stack therein the paper sheets respectively character-identified, with respect to the serial number thereof, by the identification unit;
a transport unit configured to transport the paper sheets from the reception unit to the first and second stacking units;
a control unit configured to control the transport unit, such that first paper sheets, which are recognized as genuine, all digits of each serial number of which are respectively character-identified by the identification unit, are transported to the first stacking unit, and such that second paper sheets, which are recognized as genuine, though one or more digits of each serial number of which are not character-identified by the identification unit, are transported to the second stacking unit;
a memory unit configured to store therein each serial number of the first paper sheets that is character-identified by the identification unit; and
a display unit configured to display the characters respectively included in each serial number of the second paper sheets and identified by the identification unit.

9. The paper sheet handling machine according to claim 8, wherein the display unit displays the image of a part corresponding to the serial number region, in each paper sheet image of the second paper sheets, with the characters respectively identified by the identification unit being arranged together with the image of the part.

10. The paper sheet handling machine according to claim 8, wherein the memory unit stores therein the characters respectively identified by the identification unit in each serial number of the second paper sheets, with the image of the part corresponding to the serial number region in each paper sheet image of the second paper sheets being associated with the characters.

11. A paper sheet handling method comprising:
taking an image of each paper sheet and generating a paper sheet image, by using an imaging unit;
identifying a character of each digit position in a serial number, from a serial number region of the paper sheet image, by using an identification unit;
extracting the image of a part corresponding to the serial number region from the paper sheet image and outputting the image of the part, when there is a digit position whose character therein cannot be identified by the identification unit;
displaying each character identified by the identification unit, together with the outputted image;
inputting the character corresponding to each digit position whose character therein cannot be identified by the identification unit; and
storing the serial number of the paper sheet, which is generated by combining each character identified by the identification unit with the input character, together with a flag in a memory unit, the flag indicating that the serial number includes a digit input by an operator.

12. A paper sheet handling method comprising:
taking an image of each paper sheet and generating a paper sheet image, by using an imaging unit;
identifying a character of each digit position included in a serial number, from a serial number region of the paper sheet image, by using an identification unit;
extracting a part image corresponding to each digit position whose character therein cannot be identified by the identification unit from the serial number region of the paper sheet image and outputting the part image, when there is a digit position whose character therein cannot be identified by the identification unit;
storing each serial number, all digits of which are respectively character-identified by the identification unit, in a memory unit; and
storing each character identified by the identification unit, with the part image being associated with the character, in the memory unit, when there is a digit position whose character therein cannot be identified by the identification unit.

13. A paper sheet handling machine comprising:
an imaging unit configured to take an image and generate a paper sheet image;
an identification unit configured to identify a character of each digit position included in a serial number, from a serial number region of the paper sheet image; and
a list generating unit configured to generate and output a list of each serial number including a digit position whose character therein cannot be identified by the identification unit, wherein the list does not include a serial number in which all digits are respectively character-identified by the identification unit.

* * * * *